(12) United States Patent
Fujita et al.

(10) Patent No.: US 11,418,406 B2
(45) Date of Patent: Aug. 16, 2022

(54) INFORMATION PROCESSING APPARATUS AND INFORMATION PROCESSING METHOD

(71) Applicant: SONY CORPORATION, Tokyo (JP)

(72) Inventors: Koji Fujita, Tokyo (JP); Ryo Sokabe, Saitama (JP); Takuma Higo, Tokyo (JP); Kenichiro Takyu, Tokyo (JP); Ayaka Satoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 16/339,136

(22) PCT Filed: Oct. 19, 2017

(86) PCT No.: PCT/JP2017/037827
§ 371 (c)(1),
(2) Date: Apr. 3, 2019

(87) PCT Pub. No.: WO2018/096849
PCT Pub. Date: May 31, 2018

(65) Prior Publication Data
US 2019/0273664 A1 Sep. 5, 2019

(30) Foreign Application Priority Data

Nov. 25, 2016 (JP) .............................. JP2016-229277

(51) Int. Cl.
*H04L 12/24* (2006.01)
*H04L 41/22* (2022.01)
(Continued)

(52) U.S. Cl.
CPC .......... *H04L 41/22* (2013.01); *H04L 41/0853* (2013.01); *H04L 41/0856* (2013.01);
(Continued)

(58) Field of Classification Search
CPC ..... H04L 41/22; H04L 41/0853; H04L 41/12; H04L 41/0856; H04N 21/431; H04N 21/436; H04N 21/442; H04R 3/12
(Continued)

(56) References Cited

U.S. PATENT DOCUMENTS

2006/0262221 A1 11/2006 Yuasa et al.
2008/0021577 A1* 1/2008 Ijichi ................... G11B 27/105
700/94
(Continued)

FOREIGN PATENT DOCUMENTS

CN 1874472 A 12/2006
CN 107005750 A 8/2017
(Continued)

OTHER PUBLICATIONS

International Search Report and Written Opinion of PCT Application No. PCT/JP2017/037827, dated Nov. 21, 2017, 06 pages of ISRWO.

(Continued)

*Primary Examiner* — Sibte H Bukhari
(74) *Attorney, Agent, or Firm* — Chip Law Group

(57) ABSTRACT

An information processing apparatus according to an embodiment of the present technology includes a detection unit; a first acquisition unit; a second acquisition unit; and a generation unit. The detection unit detects a reproduction apparatus. The first acquisition unit acquires a reproduction mode of the detected reproduction apparatus. The second acquisition unit acquires history information, the history information including a reproduction apparatus selected in a past and a reproduction mode of the reproduction apparatus when the reproduction apparatus has been selected in the past. The generation unit generates an operation image, the operation image including detection information and the
(Continued)

acquired history information, the detection information including the detected reproduction apparatus and a reproduction mode of the reproduction apparatus when the reproduction apparatus has been detected.

14 Claims, 12 Drawing Sheets

(51) Int. Cl.
    *H04L 41/0853*    (2022.01)
    *H04L 41/12*    (2022.01)
    *H04N 21/442*    (2011.01)
    *H04R 3/12*    (2006.01)
    *H04N 21/431*    (2011.01)
    *H04N 21/436*    (2011.01)

(52) U.S. Cl.
    CPC ........... *H04L 41/12* (2013.01); *H04N 21/431* (2013.01); *H04N 21/436* (2013.01); *H04N 21/442* (2013.01); *H04R 3/12* (2013.01)

(58) Field of Classification Search
    USPC .......................................... 709/224; 702/224
    See application file for complete search history.

(56) References Cited

U.S. PATENT DOCUMENTS

| | | | |
|---|---|---|---|
| 2010/0299639 A1 | 11/2010 | Ramsay et al. | |
| 2014/0222961 A1* | 8/2014 | Takahashi | H04N 21/44209 |
| | | | 709/217 |
| 2014/0337412 A1* | 11/2014 | Chae | H04N 21/4402 |
| | | | 709/203 |
| 2016/0026427 A1 | 1/2016 | Kuper | |
| 2016/0026428 A1 | 1/2016 | Morganstern et al. | |
| 2016/0357513 A1 | 12/2016 | Morganstern et al. | |
| 2017/0315715 A1 | 11/2017 | Fujita et al. | |
| 2019/0179602 A1 | 6/2019 | Morganstern et al. | |

FOREIGN PATENT DOCUMENTS

| | | | | |
|---|---|---|---|---|
| EP | 1729517 A2 * | 12/2006 | | H04N 21/4104 |
| EP | 1729517 A2 | 12/2006 | | |
| EP | 3111662 A1 | 1/2017 | | |
| EP | 3240296 A1 | 11/2017 | | |
| JP | 2012-114577 A | 6/2012 | | |
| JP | 5055769 B2 | 10/2012 | | |
| JP | S635047 B2 | 1/2020 | | |
| KR | 10-2006-0121105 A | 11/2006 | | |
| RU | 2017116718 A | 11/2018 | | |
| WO | 2009/086599 A1 | 7/2009 | | |
| WO | 2016/014538 A1 | 1/2016 | | |
| WO | 2016/014647 A1 | 1/2016 | | |
| WO | 2016/103546 A1 | 6/2016 | | |

OTHER PUBLICATIONS

Extended European Search Report of EP Application No. 17874124.5, dated Mar. 23, 2020, 09 pages.

Office Action for JP Patent Application No. 2018-552466, dated Sep. 28, 2021, 02 pages of English Translation and 02 pages of Office Action.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/037827 filed on Oct. 19, 2017, which claims priority benefit of Japanese Patent Application No. JP 2016-229277 filed in the Japan Patent Office on Nov. 25, 2016. Each of the above-referenced applications is hereby incorporated herein by reference in its entirety.

TECHNICAL FIELD

The present technology relates to an information processing apparatus, an information processing method, and a program that are applicable to control of a reproduction apparatus.

BACKGROUND ART

In the past, a system in which a home network is established in a house and a reproduction apparatus connected thereto reproduces content such as music and video has been known. For example, Patent Literature 1 describes a method of controlling multi-room reproduction in which a plurality of reproduction apparatuses connected to a network forms a group and the group executes synchronous reproduction of the same content (see, for example, paragraphs [0043] to [0046] and FIG. 8 of Patent Literature 1).

Further, Patent Literature 2 describes that a broadcasting system that uses, instead of a speaker, a multifunction peripheral placed in a hall to realize a function such as existing public announcement. In this broadcasting system, a group information table storing information regarding a group including a plurality of multifunction peripherals is created, and displayed on a user's terminal. The user selects, from the displayed group information table, a group to be caused to output sound. Further, it is possible to create a new group and register it in the group information table (see, for example, paragraphs [0068] to [0085] and [0116] to [0118], and FIGS. 6 and 14 of Patent Literature 2).

CITATION LIST

Patent Literature

Patent Literature 1: WO 2016/103546
Patent Literature 2: Japanese Patent Application Laid-open No. 2012-114577

DISCLOSURE OF INVENTION

Technical Problem

Also in the future, it is considered that technologies for controlling a plurality of reproduction apparatuses via a network or the like to reproduce content are often used, and a technology capable of improving user operability is desired.

In view of the circumstances as described above, it is an object of the present technology to provide an information processing apparatus, an information processing method, and a program capable of controlling a reproduction apparatus with good operability.

Solution to Problem

In order to achieve the above-mentioned object, in accordance with an embodiment of the present technology, an information processing apparatus includes a detection unit; a first acquisition unit; a second acquisition unit; and a generation unit.

The detection unit detects a reproduction apparatus.

The first acquisition unit acquires a reproduction mode of the detected reproduction apparatus.

The second acquisition unit acquires history information, the history information including a reproduction apparatus selected in a past and a reproduction mode of the reproduction apparatus when the reproduction apparatus has been selected in the past.

The generation unit generates an operation image, the operation image including detection information and the acquired history information, the detection information including the detected reproduction apparatus and a reproduction mode of the reproduction apparatus when the reproduction apparatus has been detected.

In this information processing apparatus, detection information including the detected reproduction apparatus and the reproduction mode thereof, and an operation image including the reproduction apparatus selected in the past and the reproduction mode at that time are generated. Accordingly, for example, it is possible to easily reproduce the past reproduction environment by using the displayed history information. As a result, it is possible to control the reproduction apparatus with good operability.

The reproduction mode may include a single reproduction mode and a group reproduction mode.

Accordingly, it is possible to control reproduction of content in the single reproduction mode and reproduction of content in the group reproduction mode with good operability.

Each of the history information and the detection information may include, as information regarding the reproduction apparatus having the reproduction mode being the single reproduction mode, at least one of a name of the reproduction apparatus and an icon representing that it is the single reproduction mode.

Accordingly, it is possible to easily grasp the reproduction apparatus selected in the past and the reproduction mode of the detected reproduction apparatus.

Each of the history information and the detection information may include, as information regarding the reproduction apparatus having the reproduction mode being the group reproduction mode, at least one of a name of a group including the reproduction apparatus and an icon representing that it is the group reproduction mode.

Accordingly, it is possible to easily grasp the reproduction apparatus selected in the past and the reproduction mode of the detected reproduction apparatus.

The group reproduction mode may include a synchronous reproduction mode, a surround reproduction mode, and a stereo reproduction mode.

Accordingly, it is possible to control reproduction of content in each of the synchronous reproduction mode, the surround reproduction mode, and the stereo reproduction mode with good operability.

The operation image may include a first display area and a second display area, the history information being displayed in the first display area, new detection information that is not included in the history information among the detection information being displayed in the second display area.

For example, it is possible to improve user operability by appropriately setting the display position and the like of each of the first and second display areas.

The operation image may be a list. In this case, the first display area may be set above the second display area.

Accordingly, it is possible to easily select the reproduction apparatus selected in the past and the reproduction mode thereof again, and exert high operability.

The detection unit may detect an unconnected reproduction apparatus requiring a connection instruction from a user. In this case, the list may include a third display area, information regarding the unconnected reproduction apparatus being displayed in the third display area.

Accordingly, it is possible to easily grasp the unconnected reproduction apparatus, and improve operability.

The detection unit may detect the unconnected reproduction apparatus through short-range wireless communication.

Accordingly, since the unconnected reproduction apparatus in the vicinity of the user is detected, it is possible to easily determine whether or not to input a connection instruction, and exert high operability.

The third display area may be set above the first display area.

Accordingly, it is possible to easily grasp the unconnected reproduction apparatus, and improve operability.

The generation unit may determine an operation status of the reproduction apparatus and the reproduction mode thereof included in the history information, and generates the operation image in such a way that a display form differs depending on a result of the determination.

Accordingly, it is possible to easily determine whether or not whether or not the reproduction apparatus selected in the past and the reproduction mode thereof are still being established, and exert high operability.

The information processing apparatus may further include a reproduction control unit that instructs reproduction of content by the reproduction apparatus and the reproduction mode thereof included in the operation image.

Accordingly, for example, it is possible to easily reproduce the past reproduction environment, and control the reproduction apparatus with good operability.

The second acquisition unit may acquire the history information from the detected reproduction apparatus.

Accordingly, it is possible to reduce the necessary memory capacity, and acquire the history information with high accuracy.

An information processing method according to an embodiment of the present technology is an information processing method executed by a computer system, including detecting a reproduction apparatus.

A reproduction mode of the detected reproduction apparatus is acquired.

History information is acquired, the history information including a reproduction apparatus selected in a past and a reproduction mode of the reproduction apparatus when the reproduction apparatus has been selected in the past.

An operation image is generated, the operation image including detection information and the acquired history information, the detection information including the detected reproduction apparatus and a reproduction mode of the reproduction apparatus when the reproduction apparatus has been detected.

A program according to an embodiment of the present technology causes a computer system to execute the steps of:
  detecting a reproduction apparatus;
  acquiring a reproduction mode of the detected reproduction apparatus;
  acquiring history information, the history information including a reproduction apparatus selected in a past and a reproduction mode of the reproduction apparatus when the reproduction apparatus has been selected in the past; and
  generating an operation image, the operation image including detection information and the acquired history information, the detection information including the detected reproduction apparatus and a reproduction mode of the reproduction apparatus when the reproduction apparatus has been detected.

Advantageous Effects of Invention

As described above, in accordance with the present technology, it is possible to control a reproduction apparatus with good operability. It should be noted that the effect described here is not necessarily limitative and may be any effect described in the present disclosure.

MODE(S) FOR CARRYING OUT THE INVENTION

Hereinafter, an embodiment of the present technology will be described with reference to the drawings.

[Content Reproduction System]

Figure 1:
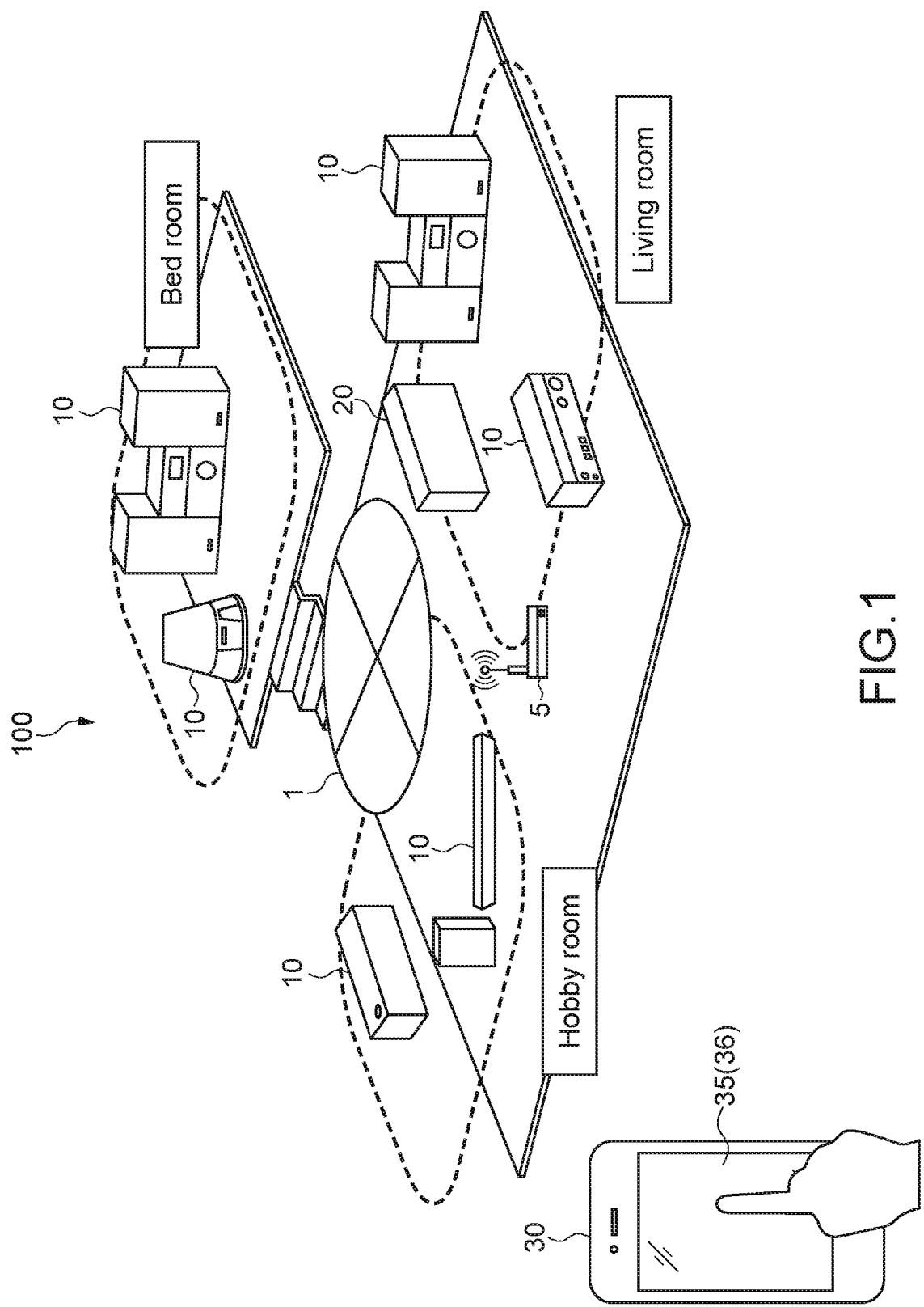
FIG. 1 is a schematic diagram showing a configuration example of a content reproduction system according to an embodiment.

FIG. 1 is a schematic diagram showing a configuration example of a content reproduction system according to an embodiment of the present technology. A content reproduction system 100 includes a home network 1 established in a house, a plurality of reproduction apparatuses 10 connected thereto, a server apparatus 20 that provides content, and a portable terminal 30. The portable terminal 30 corresponds to an information processing apparatus according to an embodiment of the present technology.

The plurality of reproduction apparatuses 10, the server apparatus 20, and the portable terminal 30 are connected to the home network 1 through wireless LAN communication such as WiFi via an access point 5. As the home network 1, for example, a network conforming to the DLNA (registered trademark) (Digital Living Network Alliance) standard is used.

For example, the plurality of reproduction apparatuses 10 each function as a DMR (Digital Media Renderer), and the server apparatus 20 functions as a DMS (Digital Media Server). Further, the portable terminal 30 functions as a DMC (Digital Media Controller). Note that the present technology is applicable also to the case where a network using another protocol is established.

As shown in FIG. 1, the plurality of reproduction apparatuses 10 are arranged in each room such as a living room, a hobby room, and a bed room. The portable terminal 30 transmits an instruction to acquire and reproduce content from the server apparatus 20 to each of the plurality of reproduction apparatuses 10 by using, for example, a control message of UPnP (Universal Plug and Play).

Therefore, a user is capable of controlling the operation of reproducing the reproduction apparatuses 10 arranged in each room by operating the portable terminal 30. Note that it is also possible to cause the reproduction apparatuses 10 to reproduce content through short-range wireless communication such as Bluetooth (registered trademark).

Further, assumption is made that the home network 1 and a global network are connected to each other via a home gateway (not shown). In this case, by operating the portable terminal 30, it is also possible to cause each of the reproduction apparatuses 10 to reproduce content in a content server present in the global network (cloud).

Further, it is also possible to transfer or streaming-distribute content stored in the portable terminal 30 to the reproduction apparatus 10 to reproduce the content, and cause the reproduction apparatuses 10 to reproduce local content therein. The local content in the reproduction apparatus 10 represents, for example, content read via a CD or a USB, or content fetched from a radio or the like.

In this embodiment, the plurality of reproduction apparatuses 10 each reproduce music content. However, the present technology is not limited to reproduction of music content, and is applicable to reproduction of various types of content such as movie. Further, also the number of reproduction apparatuses 10, the number of server apparatuses 20, and the like are not limited.

As the reproduction apparatus 10, for example, various CE (Consumer Electronics) such as a television receiver, a PC (Personal computer), an audio video receiver, a video monitor, and a home game device is used. Further, the reproduction apparatus according to the present technology also includes in-vehicle audio equipment mounted on a car, a headphone attached to a user.

As the server apparatus 20, for example, a PC, a network compatible HDD (NAS), or the like is used. As the portable terminal 30, typically, a smartphone is used. However, the present technology is not limited thereto, and various PDAs (Personal Digital Assistants) such as tablet terminals may be used. In addition, various computers can be used as the information processing apparatus according to the present technology.

Note that as the reproduction apparatus 10, one that is capable of operating as a DMP (Digital Media Player) may be used. In this case, by operating the UI (User Interface) of the reproduction apparatus 10, reproduction of content can be controlled. Further, in this case, the reproduction apparatus 10 can function as the information processing apparatus according to the embodiment of the present technology.

[Configuration of Portable Terminal]

Figure 2:
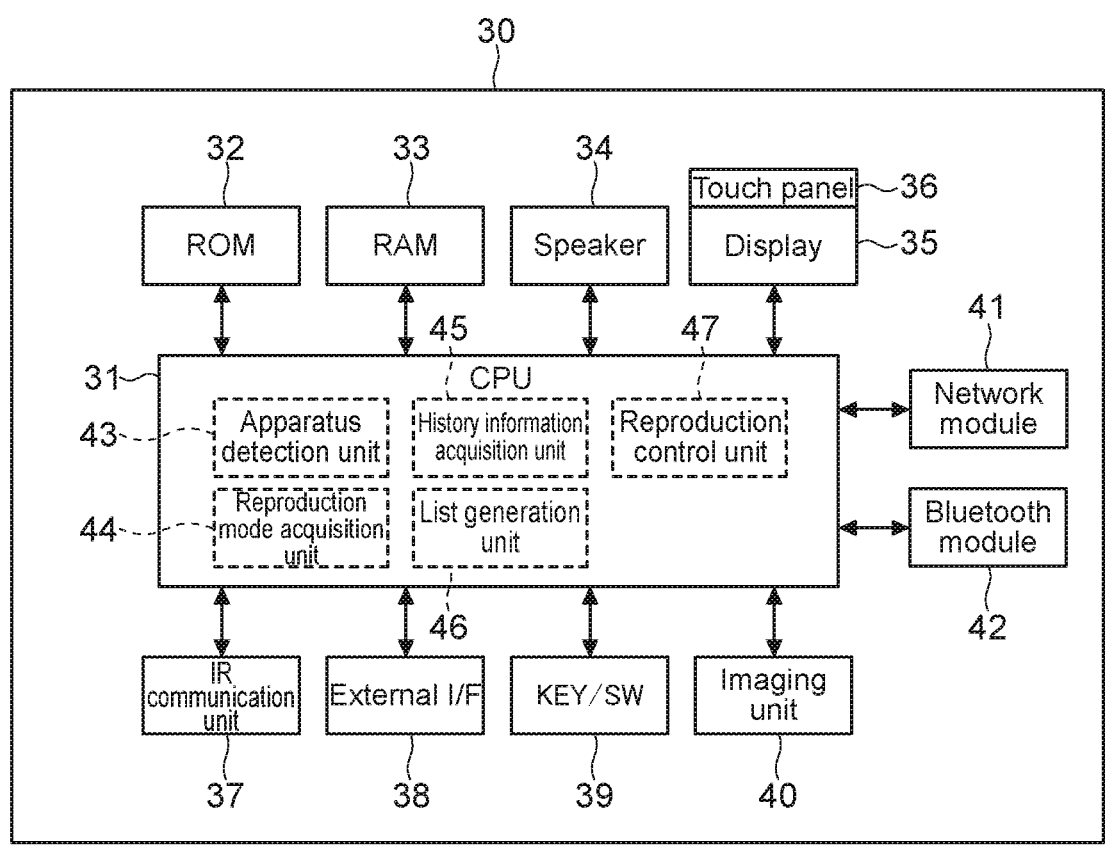
FIG. 2 is a block diagram showing a configuration example of a portable terminal.

FIG. 2 is a block diagram showing a configuration example of the portable terminal 30. The portable terminal 30 includes a CPU (Central Processing Unit) 31, a ROM (Read Only Memory) 32, a RAM (Random Access Memory) 33, a speaker 34, a display 35, and a touch panel 36. Further, the portable terminal 30 includes an infrared (IR) communication unit 37, an external I/F (interface) 38, a key/switch 39, and an imaging unit 40. Further, the portable terminal 30 includes a network module 41 and a Bluetooth module 42.

The CPU 31 transmits/receives signals to/from each block of the portable terminal 30 and performs various types of calculation, and integrally controls various types of processing executed by the portable terminal 30, such as an instruction to reproduce content to the reproduction apparatuses 10 and display of a GUI (Graphical User Interface) on the display 35 (the touch panel 36).

The ROM 32 stores various types of data processed by the CPU 31, such as various types of image data and metadata, and various programs such as applications. The RAM 33 is used as a work area of the CPU 31. When a program such as an application is executed, various types of data necessary for executing the program are read to the RAM 33.

Instead of or in addition to the ROM 32, a non-volatile memory such as an HDD (Hard Disk Drive), a flash memory, and another solid-state memory may be provided. Then, the above-mentioned various types of data or the program may be stored in these storage devices. In this embodiment, the ROM 32, the HDD, and the like constitute a storage unit.

The speaker 34 outputs reproduction of music content and voice guide to a user. The display 35 is, for example, a display device using liquid crystal, EL (Electro-Luminescence), or the like, and displays various GUIs and the like. As shown in FIG. 2, the display 35 is formed integrally with the touch panel 36.

The IR communication unit 37 is a module for executing IR communication with an external apparatus. The external I/F 38 is an interface for connecting to the external apparatus on the basis of, for example, the USB or HDMI (registered trademark) (High-Definition Multimedia Interface) standard.

The key/switch 39 accepts, for example, a power switch, a shortcut key, particularly, a user operation and the like that cannot be input via the touch panel 36. The imaging unit 40 includes, for example, a CMOS (Complementary Metal Oxide Semiconductor) or CCD (Charge Coupled Devices) sensor, and generates a digital image of an object.

The network module 41 is an interface for connecting to the home network 1, and a wireless LAN module such as WiFi is used, for example. The operation of the network module 41 makes it possible to perform wireless communication with the reproduction apparatuses 10 and the server apparatus 20.

The Bluetooth module 42 is a module for executing short-range wireless communication conforming to the Bluetooth standard with each of the plurality of reproduction apparatuses 10. In this embodiment, communication (BLE communication) conforming to the BLE (Bluetooth Low Energy) standard, short-range wireless communication (BT communication) conforming to the Classic Bluetooth standard can be executed. For example, it is possible to control the operation of the non-network compliant reproduction apparatus 10 that is not connected to the home network 1 through short-range wireless communication such as BLE communication.

Information processing by the portable terminal 30 having the hardware configuration as described above is realized by cooperation of software stored in the ROM 32 or the like, and hardware resources of the portable terminal 30. For example, the CPU 31 loads the program (application) according to the present technology stored in the ROM 32 or the like into the RAM 33 and executes the program, thereby realizing the information processing method according to the present technology.

As shown in FIG. 2, in this embodiment, the CPU 31 executes a predetermined program, thereby realizing functional blocks, i.e., an apparatus detection unit 43, a reproduction mode acquisition unit 44, a history information acquisition unit 45, a list generation unit 46, and a reproduction control unit 47. In order to realize these blocks, dedicated hardware such as an IC (integrated circuit) may be appropriately used.

The program such as an application is installed in the portable terminal 30 from a global network, for example. Alternatively, the program may be installed in the portable terminal 30 via a recording medium.

[Reproduction Mode of Content]

In this embodiment, it is possible to set a reproduction mode of content of each of the reproduction apparatuses 10 via the portable terminal 30. In this embodiment, any of a single reproduction mode and a group reproduction mode can be set.

The single reproduction mode is a mode in which a single reproduction apparatus 10 reproduces content. A control message is transmitted from the portable terminal 30 to the reproduction apparatus 10 in which the single reproduction mode is set, and various operations relating to reproduction of content is controlled.

For example, various types of control such as power control of the reproduction apparatus 10 (e.g., switching between a stand-by status and an active status), control of reproduction volume of content, switching of content to be reproduced, and fade in/fade out of content can be performed.

It is also possible to instruct reproduction of content in the single reproduction mode through BLE communication or BL communication. For example, the portable terminal 30 receives a BLE beacon signal transmitted from the reproduction apparatus 10, thereby detecting the reproduction apparatus 10. In accordance with a user's instruction or the like, BLE connection with the detected reproduction apparatus 10 is established. In this way, reproduction control of content, power control, and the like can be performed.

Note that the BLE connection includes both pairing connection and pairing-less connection. In the case where pairing is executed, passkey authentication or the like is executed between the portable terminal 30 and the reproduction apparatus 10.

In the case where BL communication is used, there is a need to execute pairing processing. For example, a user sets the mode of the reproduction apparatus 10 to a pairing mode, and pairing (BL connection) is established between the portable terminal 30 and the reproduction apparatus 10. In this way, reproduction control of content, power control, and the like can be performed.

The group reproduction mode is a mode in which the plurality of reproduction apparatuses 10 connected to the home network 1 form a group and the group reproduces content. As the group reproduction mode, each of a multi-room reproduction mode (synchronous reproduction mode), the surround reproduction mode, and the stereo reproduction mode can be set.

The multi-room reproduction represents a reproduction method in which the plurality of reproduction apparatuses 10 in the group perform synchronous reproduction of the same content. For example, it is possible to enjoy music with loud volume in the entire room by causing the plurality of reproduction apparatuses 10 in the same room to reproduce the same content. Alternatively, in the case of inviting a lot of friends to hold a party, for example, it is possible to liven up the party by causing the reproduction apparatuses 10 arranged in each room to reproduce the same content and simultaneously controlling the operation thereof.

For example, one of the plurality of reproduction apparatuses 10 forming a group is set as a master apparatus, and different reproduction apparatuses 10 are each set as a slave apparatus. In the case where the multi-room reproduction is executed, an instruction therefor is transmitted to the master apparatus. The master apparatus acquires content to be reproduced, and simultaneously distributes the content to each of the slave apparatuses by streaming. In this way, the multi-room reproduction of content is realized.

The method of selecting the master apparatus is not limited. For example, the reproduction apparatus 10 having a high network strength, the reproduction apparatus 10 connected to a global network, or the like is set as the master apparatus. Further, the reproduction apparatus 10 superior in reproducing content desired by the user is selected as the master apparatus. It goes without saying that the user may designate the master apparatus.

Note that the master apparatus and the slave apparatus are respectively referred to also as a parent device and a child device in some cases. Further, the slave apparatus is referred to as a player device in some cases.

By the multi-room reproduction, it is possible to execute not only synchronous reproduction of content but also control of reproduction volume, switching of content, and the like in synchronization. Meanwhile, it is also possible to individually execute control of reproduction volume and control of fade-in/fade-out or the like on each reproduction apparatus while synchronizing the reproduction positions.

The method for realizing synchronous reproduction by the master apparatus and the slave apparatus is not limited, and an arbitrary technology relating to synchronous reproduction or the like may be used, for example. For example, synchronous reproduction can be executed by achieving synchronization by clock and a time stamp and combining buffer processing therewith. Examples thereof include flow control or the like that combines an RTP (Real-time Transport Protocol) and an RTCP (RTP Control Protocol). It is also possible to use the technology described in the above-mentioned Patent Literature 1.

The surround reproduction corresponds to multi (3 ch or more)-channel reproduction, and examples thereof include 5.1 ch of a home theater. For example, the plurality of reproduction apparatuses 10 forming a group are selected, and a channel is set for each of the reproduction apparatuses 10. For example, in the case of 5.1 ch, six reproduction apparatuses 10, i.e., reproduction apparatuses for front (front right and left), center (front center), rear (rear right and left), and subwoofer (super low sound), are selected.

The method of assigning a channel to each of the reproduction apparatuses 10 is not limited, and it is executed automatically or manually. Note that in the case where the single reproduction apparatus 10 includes a plurality of speakers, a plurality of channels are assigned to the reproduction apparatus 10 in some cases. Therefore, the reproduction apparatuses 10 whose number is less than the number of channels form a group in some cases.

The configuration of the multichannel reproduction system that can be realized by setting the surround reproduction mode is not limited. For example, it is possible to establish a multichannel reproduction system of 2.1 ch to 7.1 ch, or another arbitrary number of channels.

In stereo reproduction, content is reproduced by 2 ch, i.e., LR (right and left) channels. Typically, two reproduction apparatuses 10 form a group, and any of LR channels is set to the respective reproduction apparatuses 10. The method of setting the channel is not limited. Further, the single reproduction apparatus 10 including a plurality of speakers execute stereo reproduction in some cases. Also in this case, the present technology can be applied assuming that a group is established.

In this embodiment, similarly to the multi-room reproduction, one of the plurality of reproduction apparatuses 10 forming a group is set as a master apparatus. The master apparatus controls the reproduction operation of each slave apparatus, thereby executing the surround reproduction or stereo reproduction. It goes without saying that another control method or the like may be used.

[Reproduction List]

Figure 3:
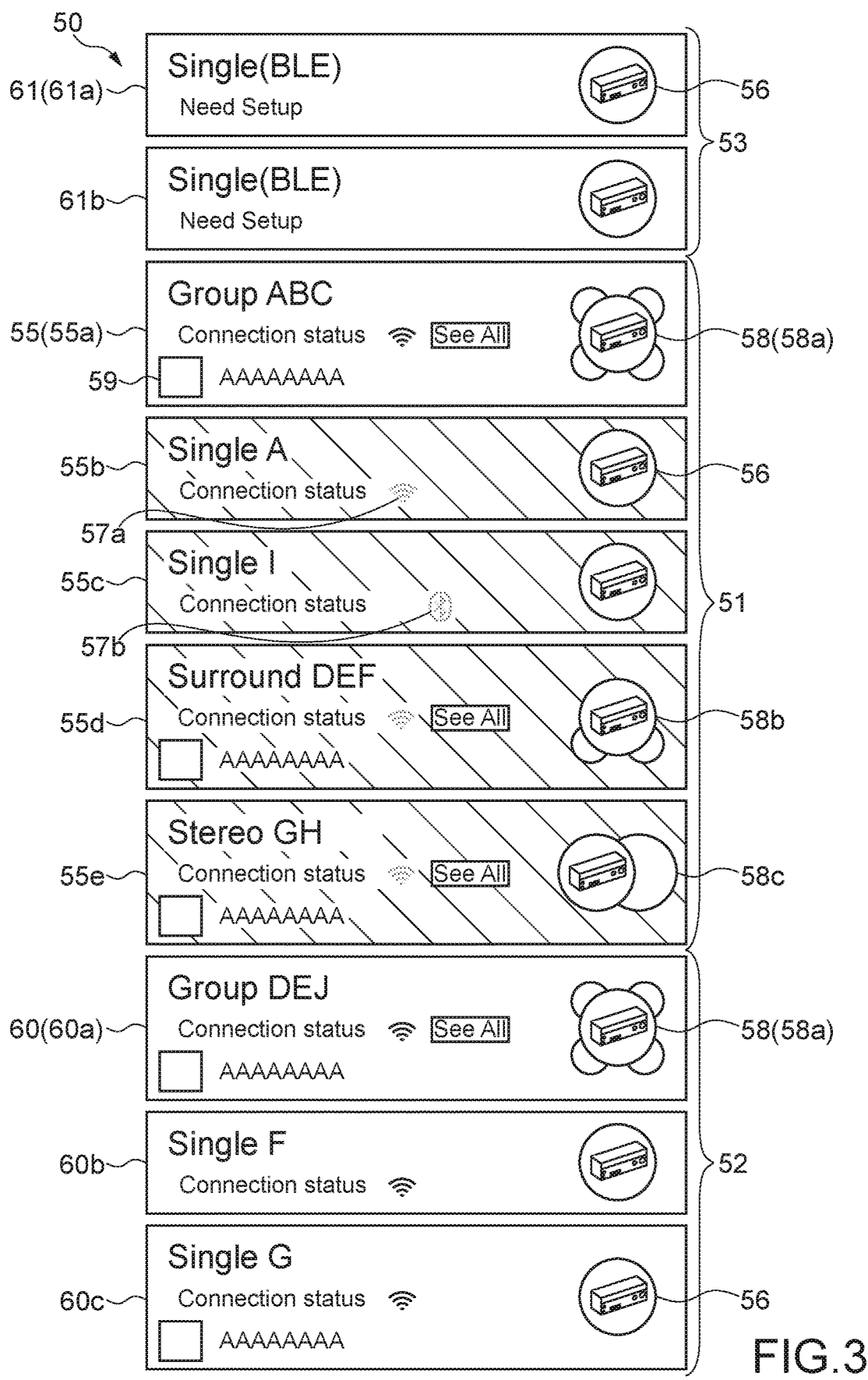
FIG. 3 is a schematic diagram showing a configuration example of a reproduction list according to this embodiment.
Figure 4:
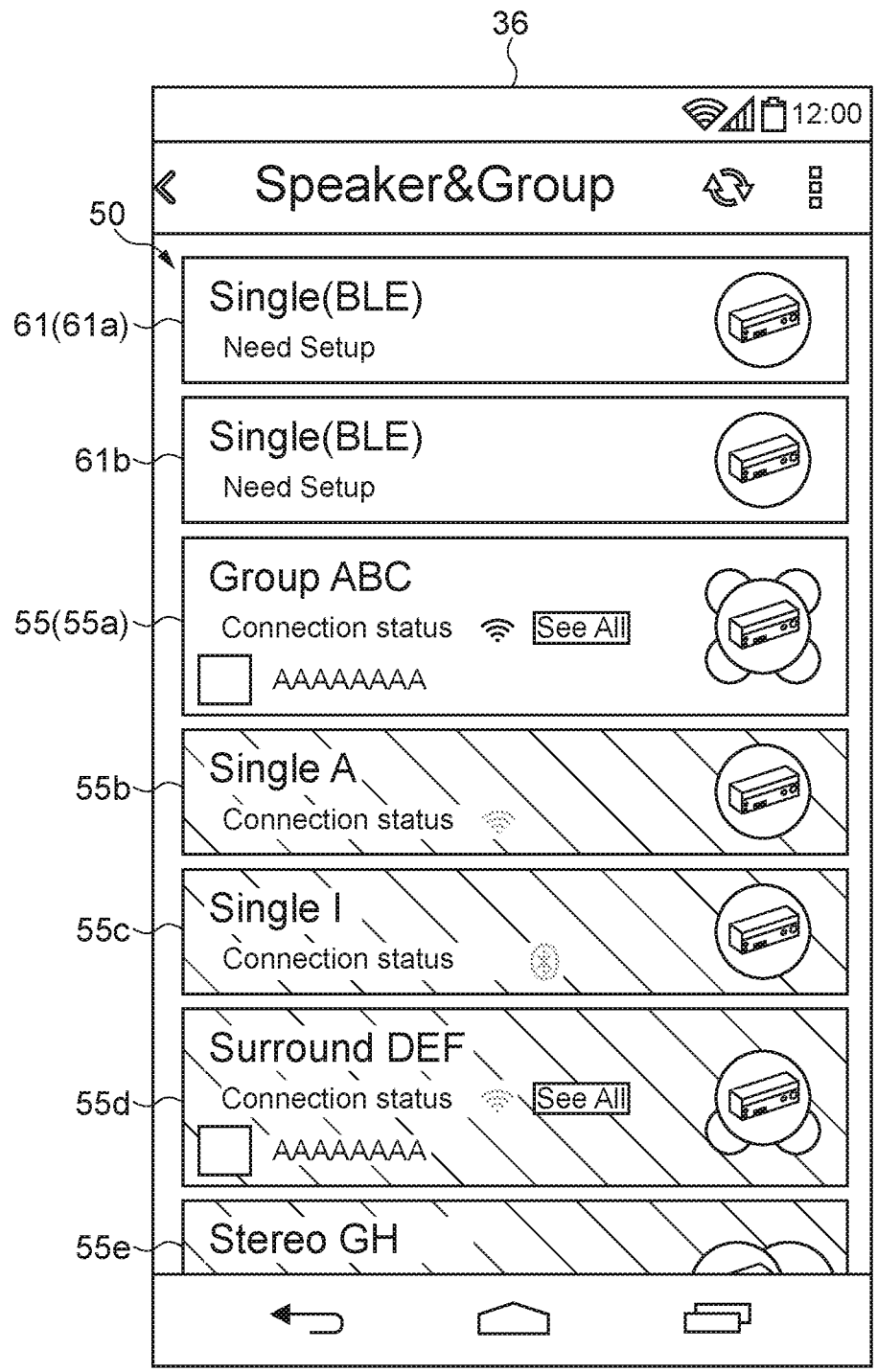
FIG. 4 is a schematic diagram showing a state where the reproduction list is displayed on a touch panel of the portable terminal.

FIG. 3 is a schematic diagram showing a configuration example of a reproduction list according to this embodiment. FIG. 4 is a schematic diagram showing a state where the reproduction list is displayed on a touch panel of the portable terminal.

An application for using the content reproduction system 100 is activated by the user using the portable terminal 30. Then, a reproduction list 50 that is an image for reproduction according to this embodiment is displayed on the touch panel 36 of the portable terminal 30. The reproduction list 50 is displayed such that it can be scrolled up and down, for example.

As shown in FIG. 3, the reproduction list 50 includes a first display area 51, a second display area 52, and a third display area 53. In the first display area 51, pieces of history information 55 (55a to 55e) including the reproduction apparatus 10 selected in the past and the reproduction mode of the reproduction apparatus 10 when it is selected are displayed.

In this embodiment, for example, as shown in the history information 55b or the like, as information regarding the reproduction apparatus 10 having the reproduction mode being the single reproduction mode, the following information is displayed.

Name of a Reproduction Mode ("Single")+Name of the Reproduction Apparatus 10 ("A")
Icon representing that it is a single reproduction mode 56
Connection status (expressed by presence or absence of a mark indicating the connection status)
As the mark indicating the connection status, a WiFi mark 57a and a Bluetooth (registered trademark) mark 57b are respectively used in the case of connection via the home network 1 and in the case of BLE connection or BT connection.

In this embodiment, the name of the reproduction apparatus corresponds to information regarding the reproduction apparatus selected in the past. Further, the name of the reproduction mode, and an icon 56 corresponds to information regarding the reproduction mode when the reproduction apparatus has been selected in the past. Note that "Single A" may be treated as the name of the history information 55b, and it may be changeable by a user. Also in this case, with the icon 56, it is possible to grasp that it is the history information 55 of the single reproduction mode.

Further, as shown in the history information 55a or the like, as information regarding the reproduction apparatuses 10 having the reproduction mode being the group reproduction mode, the following information is displayed. Note that the member described below represents the reproduction apparatus 10 forming a group.

Name of a Group (Name of a Reproduction Mode+Name of a Member)
    In the case of the multi-room reproduction mode, "Group"+name of a member
    In the case of the surround reproduction mode, "Surround"+name of a member
    In the case of the stereo reproduction mode, "Stereo"+name of a member
Icon representing that it is a group reproduction mode 58
    In the case of the multi-room reproduction mode, an icon 58a
    In the case of the surround reproduction mode, an icon 58b
    In the case of the stereo reproduction mode, an icon 58c
Connection status (expressed by presence or absence of active display of the WiFi mark 57a)
Information 59 regarding reproduction content In this embodiment, the name of the member in the name of the group corresponds to the information regarding the reproduction apparatus selected in the past. Further, the name of the reproduction mode and the icon 58 represent the information regarding the reproduction mode when the reproduction apparatus has been selected in the past. Note that the name of the group may be changeable by the user. With at least the icon 58, it is possible to grasp that it is the history information 55 of the group reproduction mode (the multi-room reproduction mode, the surround reproduction mode, or the stereo reproduction mode). Further, the information 59 regarding reproduction content may be display also in the history information 55 of the single reproduction mode.

Note that the history information 55 of the group reproduction mode corresponds to each of the piece of history information 55 of the reproduction apparatuses 10 forming the group. For example, the history information 55a corresponds to the history information 55 of each of reproduction apparatuses A, B, and C that have been selected in the past and have executed the multi-room reproduction. By displaying each of the pieces of history information 55 as group information with reference to a group as described above, it is possible to, for example, easily reproduce the group and improve operability.

The history information 55 is generated and stored every time the reproduction apparatus 10 and the reproduction mode thereof are selected via the portable terminal 30. Regarding the history information 55, the history information 55 of the newly-selected reproduction apparatus 10 is displayed above the first display area 51. Then, every time the history information 55 is newly generated, the history information 55 is sequentially added above the first display area 51.

Note that the "selected" typically represents that it is selected by a user using the portable terminal 30, and the history information 55 is generated for each user. For that reason, for example, the history information 55 is generated in association with identification information (ID) of the user, identification information (ID) of the portable terminal 30, or the like. In addition, an arbitrary method for generating the history information 55 for each user may be adopted. Note that the "user" in the present disclosure is not limited to one particular person, and a plurality of persons sharing the portable terminal 30 are the "user" in some cases.

In the example shown in FIG. 3, reproduction apparatuses G and H have been selected in the past, and have executed stereo reproduction. After that, reproduction apparatuses D, E, and F have been selected and have executed surround reproduction. After that, a reproduction apparatus I has been selected, and content has been reproduced in a single reproduction mode. Note that in this case, the reproduction apparatus I is controlled through BLE communication or BT communication.

After that, the reproduction apparatus A has been selected, and content has been reproduced in a single reproduction mode. Then, as the most recent operation, the reproduction apparatus A, B, and C have been selected and have executed the multi-room reproduction. When this multi-room reproduction is executed, the reproduction mode of the reproduction apparatus A is switched from the single reproduction mode to the multi-room reproduction.

In the example shown in FIG. 3, the connection status of the history information 55a of "Group ABC" is an active status. This represents that the reproduction apparatuses A, B, and C still form a group and the multi-room reproduction can be performed. That is, the reproduction apparatuses A, B, and C have been detected, and the modes thereof have each been set to the multi-room reproduction mode indicating that they belong to the same group.

Meanwhile, the connection status of each of the pieces of history information 55b to 55e is a non-active status. This represents that in the current status, content cannot be reproduced by the reproduction apparatus 10 and the reproduction mode thereof included in each of the pieces of history information 55. Examples of such a case include a case where the reproduction apparatus 10 included in the history information 55 is not detected or not connected. Other examples include a case where the mode of the reproduction apparatus is set to a reproduction mode different from the reproduction mode included in the history information 55.

In the example shown in FIG. 3, since the connection status of the history information 55a of "Group ABC" is the active status, the mode of the reproduction apparatus A is the multi-room reproduction mode. Therefore, the connection status of the history information 55b of "Single A" is the non-active status.

In this embodiment, the connection status corresponds to the operation status of the reproduction apparatus 10 and the reproduction mode thereof included in the history information 55. In this embodiment, the list generation unit 46 determines the connection status of each of the pieces of history information 55, and the reproduction list 50 is generated so that the display form differs depending on the determination result.

As described above, the presence or absence of active display of the WiFi mark 57a or the Bluetooth (registered trademark) mark 57b is appropriately controlled. Further, different colors are displayed as the background color of the history information 55 in accordance with the connection status. For example, the background color is respectively white and gray (gray out) in the case where the connection status is the active status and the non-active status. It goes without saying that the present technology is not limited thereto.

In the second display area 52, detection information including the reproduction apparatus 10 detected by the portable terminal 30 and the reproduction mode thereof when the reproduction apparatus 10 has been detected is displayed. In particular, in this embodiment, pieces of new detection information 60 (60a to 60c) that are not included in the history information 55 among the detection information are displayed. That is, in the second display area 52, the reproduction apparatus 10 that has not been detected in the past and the reproduction mode thereof among the reproduction apparatuses 10 detected by the portable terminal 30 and the reproduction modes thereof are displayed.

In this embodiment, information displayed as the new detection information 60 is similar to the history information 55. That is, as information regarding the reproduction apparatus 10 having the reproduction mode being the single reproduction mode, the name of the reproduction mode, the icon representing that it is the single reproduction mode 56, and the connection status are displayed. The name of the reproduction apparatus corresponds to the information regarding the detected reproduction apparatus. Further, the name of the reproduction mode and the icon 56 corresponds to the information regarding the reproduction mode when the reproduction apparatus is detected. The name of the reproduction mode may be changeable by the user.

Further, as information regarding the reproduction apparatus 10 having the reproduction mode being the group reproduction mode, the name of the group, the icon representing that it is the group reproduction mode 58, the connection status, and the information 59 regarding reproduction content are displayed. The name of the member in the name of the group corresponds to the information regarding the detected reproduction apparatus. Further, the name of the reproduction mode and the icon 58 corresponds to the information regarding the reproduction mode when the reproduction apparatus is detected. The name of the group may be changeable by the user.

In the example shown in FIG. 3, the reproduction apparatus G in the single reproduction mode, the reproduction apparatus F in the single reproduction mode, and the group "Group DEJ" in the multi-room reproduction mode are detected, and displayed as the new detection information 60. For example, this is considered because another user creates the group "Group DEJ" in the multi-room reproduction mode by using another portable terminal or the like, and the reproduction apparatuses G and F are each used in the single reproduction mode. Alternatively, regarding the case where the mode of the newly detected reproduction apparatus 10 is set to the single reproduction mode, it is also conceivable that the reproduction apparatuses G and F are newly added to the content reproduction system 100.

For example, also the following case is conceivable. As shown in the history information 55d, a user has created the group "Surround DEF" in the surround reproduction mode with the reproduction apparatuses D, E, and F in the past. After that, another user has changed the group, for example, and the group "Group DEJ" in the multi-room reproduction mode is created. Then, the created group "Group DEJ" has been detected. In addition, various situations are conceivable.

Since the new detection information 60 is information regarding the currently-detected reproduction apparatuses 10 and the reproduction modes thereof, all the connection state are the active state. Note that in this embodiment, the newly-generated new detection information 60 is sequentially added below the second display area 52.

As will be described later, when the history information 55 and the new detection information 60 displayed in the first and second display areas 51 and 52 are selected, reproduction of content by the reproduction apparatus 10 and the reproduction mode thereof included in the selected history information 55 and new detection information 60 is instructed. For example, when the history information 55 or the new detection information 60 in the active status is selected, content is reproduced in the currently-realized reproduction environment corresponding to each of the pieces of information. When the history information 55 in the non-active status is selected, processing (processing of making it be in the active status) for establishing the corresponding reproduction environment is executed, and content is reproduced in the case where it is succeeded.

As shown in FIG. 3, in this embodiment, in the reproduction list 50, the first display area 51 in which the history information 55 is displayed is set above the second display area 52 in which the new detection information 60 is displayed. As a result, the user is capable of easily selecting the reproduction apparatus 10 selected in the past and the reproduction mode thereof, and it is possible to easily reproduce the favorite reproduction environment that is frequently used.

In particular, since the history information 55 of the newly-selected reproduction apparatus 10 is sequentially added to the uppermost part of the first display area 51, it is possible to select the reproduction apparatus 10 with high possibility to use, and the reproduction mode thereof. As a result, it is possible to easily reproduce the recent favorite reproduction environment, and exert very high operability.

Meanwhile, by selecting the new detection information 60, it is possible to easily establish a new reproduction environment. Note that the new detection information 60 is sequentially added below the second display area 52. Therefore, it is possible to prevent, for example, the new detection information 60 regarding the reproduction environment that is not preferred from being rapidly added above the second display area 52, which obstructs the operation on the reproduction list. For example, it is possible to prevent, when inputting a selection operation, the new detection information 60 from being inadvertently moved to make a selection mistake. As a result, high operability is exerted.

In the third display area 53, detection information 61 of an unconnected reproduction apparatus 10 detected by receiving a BLE beacon signal is displayed. The unconnected reproduction apparatus 10 displayed here is a reproduction apparatus 10 that requires a connection instruction for establishing BLT connection from a user.

The detection information 61 of the unconnected reproduction apparatus 10 includes the following information.

Text "Single(BLE)" indicating that it is detected by a BLE beacon signal

Icon representing that it is the single reproduction mode 56

Text "Need Setup" indicating that it requires a connection instruction.

Note that the detection information 61 of the unconnected reproduction apparatus 10 is sequentially added to information of the third display area 53 every time it is newly generated.

When the detection information 61 displayed in the third display area 53 is selected, processing for establishing BLT connection is executed. When reproduction of content is instructed through BLT communication after BLT connection is established, the history information 55 is generated and displayed in the first display area 51. Regarding the connection status of the history information 55, presence or absence of active display of the Bluetooth (registered trademark) mark 57*b*, and the background color are appropriately controlled (see the history information 55*c*).

Note that in the case where BT connection is established, the user sets the mode of the reproduction apparatuses 10 to the paring mode, and then, pairing is executed. The pairing is often performed when instructing reproduction of content. Therefore, together with establishment of BT connection, the history information 55 is generated and displayed in the first display area 51 in many cases. As a result, the new detection information 60 displayed in the second display area 52 is often information regarding the reproduction apparatus 10 detected via the home network 1. It goes without saying that the present technology is not limited thereto. The new detection information 60 of the reproduction apparatus 10 in which BLE connection or BT connection has been established before an instruction of reproduction of content is input may be generated and displayed in the second display area 52.

In the reproduction list, the third display area 53 is set above the first display area 51. By a BLE beacon signal of BLE communication that is short-range wireless communication, the reproduction apparatus 10 close to the user carrying the portable terminal 30 is detected. Therefore, since the number of reproduction apparatuses 10 to be detected is not so large, the first display area 51 is not displaced downward the reproduction list 50.

Further, in the case where there is an unconnected reproduction apparatus 10 in front of himself/herself when using the content reproduction system 100, there is a high possibility that connection for reproduction of content is desired. Therefore, by setting the third display area 53 above the reproduction list 50, it is very easy to find the unconnected reproduction apparatus 10 and input a connection instruction for the reproduction apparatus 10. As a result, high operability is exerted.

Note that in this embodiment, each of the first to third display areas 51 to 53 is not distinguishably displayed. That is, the boundary or the like between the display areas is not displayed in the reproduction list 50. Therefore, it is unnecessary for the user to, for example, distinguish the history information 55 and the new detection information 60 to input an operation, and it is possible to naturally operate the reproduction list 50 mainly for the history information 55 that is frequently used. That is, it is possible to simply input an operation for establishing a desired reproduction environment, and high operability is exerted. It goes without saying that the reproduction list 50 may be generated in such a way that the display areas can be distinguished.

It is also possible to regard the reproduction list 50 as a list relating to the reproduction environment. That is, both of the history information 55 and the new detection information 60 can be regarded as information for realizing the reproduction environment. Hereinafter, description will be made with the history formation 55 and the new detection information 60 being comprehensively described as reproduction environment information in some cases.

Figure 5:
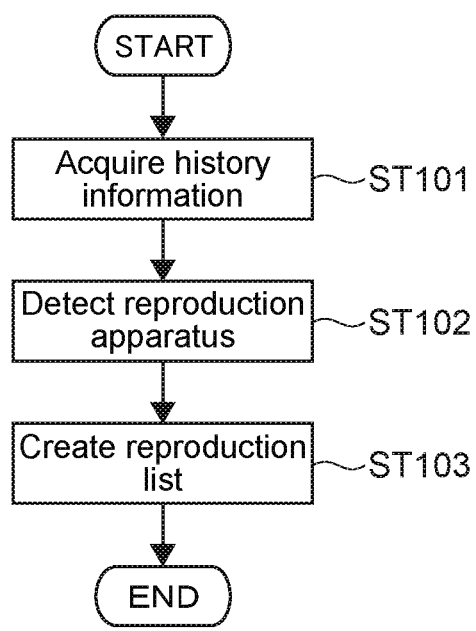
FIG. 5 is a flowchart showing outline of an example of creating the reproduction list.

FIG. 5 is a flowchart showing outline of an example of creating the reproduction list 50. When the application according to the present technology is activated, the history information acquisition unit 45 acquires the history information 55 (Step 101). In this embodiment, the history information 55 is read from a storage unit including the ROM 32 and the like of the portable terminal 30. The history information acquisition unit 45 corresponds to the second acquisition unit.

The apparatus detection unit 43 detects the reproduction apparatus 10 on the home network 1 and an unconnected reproduction apparatus 10 that transmits a BLE beacon signal (Step 102). The list generation unit 46 generates the reproduction list 50 including the history information 55, the new detection information 60, the detection information 61 of the unconnected reproduction apparatus 10 (Step 103).

Figure 6:
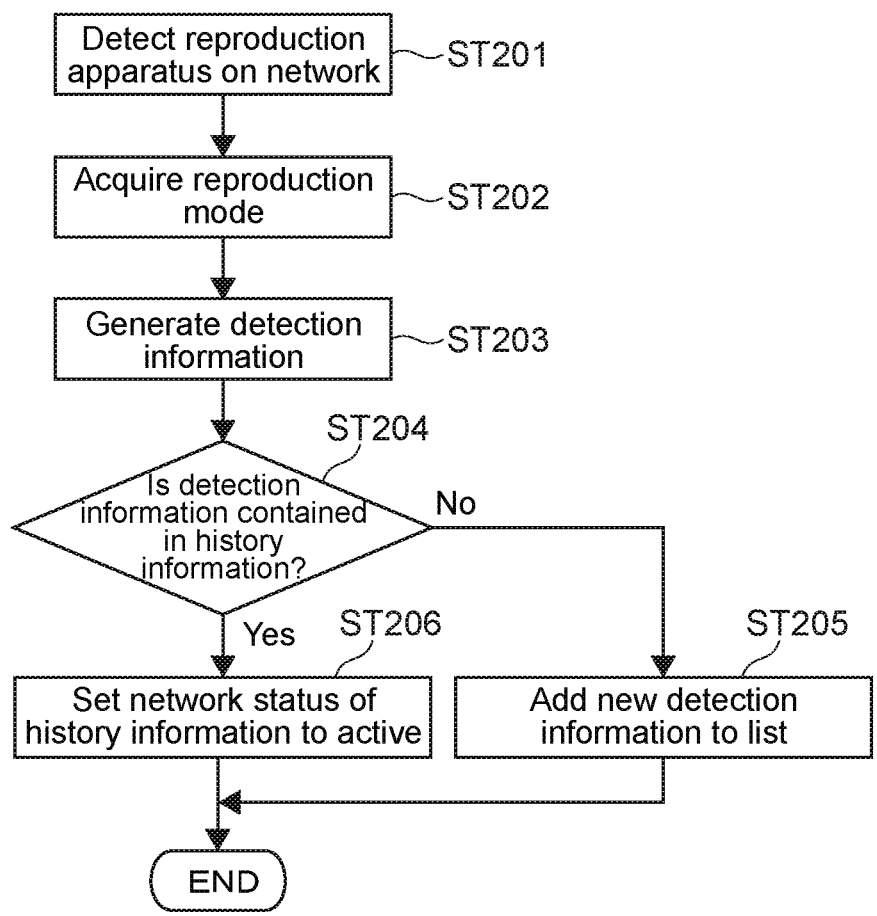
FIG. 6 is a flowchart showing a processing example from detection of a reproduction apparatus on a home network to creation of the reproduction list.

FIG. 6 is a flowchart showing a processing example from detection of the reproduction apparatus 10 on the home network 1 to creation of the reproduction list 50. First, the apparatus detection unit 43 detects the reproduction apparatus 10 on the home network 1 (Step 201).

For example, a device search message is transmitted by multicast via the network module 41. The reproduction apparatus 10 connected to the home network 1 returns a device response message in response to the device search message. As a result, it is possible to detect the reproduction apparatus 10. Another detection method may be used.

The reproduction mode acquisition unit 44 acquires the reproduction mode of the detected reproduction apparatus 10. For example, a request for apparatus information including the reproduction mode of the reproduction apparatus 10 is transmitted using a request massage generated using a method such as HTTP GET. By receiving apparatus information transmitted from the reproduction apparatus 10 in response to the request, it is possible to acquire the reproduction mode of each of the reproduction apparatuses 10. The reproduction mode acquisition unit 44 corresponds to the first acquisition unit.

The list generation unit 46 generated detection information regarding the detected reproduction apparatus 10 (Step 203). Then, whether or not the detection information is included in the history information 55 is determined (Step 204). In the case where it is the new detection information 60 in which detection information is not included in the history information 55 (No in Step 204), the new detection information 60 is added to the second display area 52 (Step 205).

In the case where detection information is included in the history information 55 (Yes in Step 204), the network status (connection status) of the history information 55 corresponding to the detection information displayed in the first display area 51 is set to active (Step 206). As a result, it is possible to generate the reproduction list 50. It goes without saying that the present technology is not limited to this method.

An example of the operation for the reproduction list 50 will be described. When the reproduction environment information (the history information 55 and the new detection information 60) in the reproduction list 50 is selected, the reproduction control unit 47 instructs reproduction of content by the reproduction apparatus 10 and the reproduction mode thereof included in the reproduction environment information.

Figure 7:
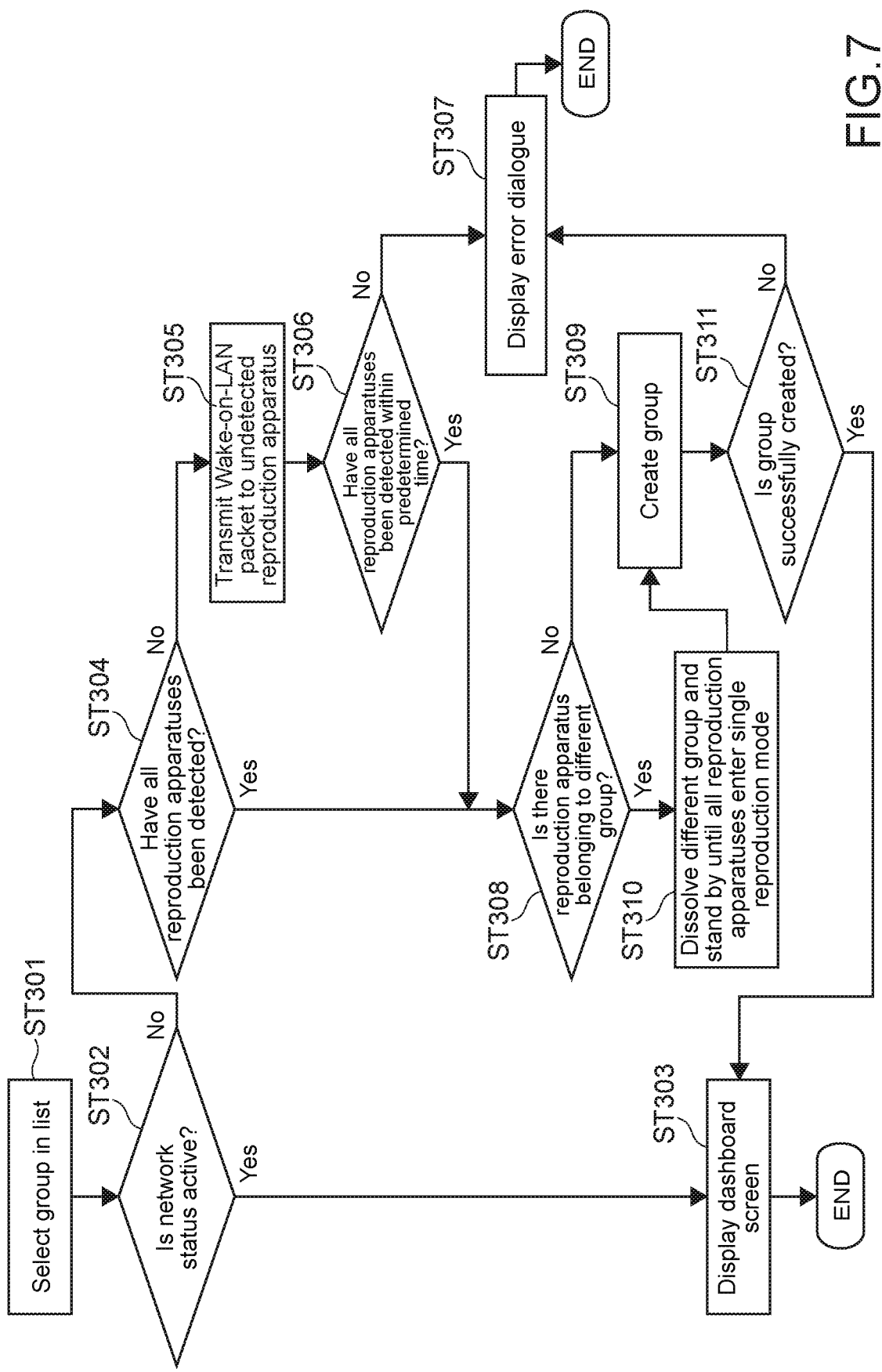
FIG. 7 is a flowchart showing a processing example in the case where reproduction environment information regarding a group reproduction mode is selected.
Figure 8:
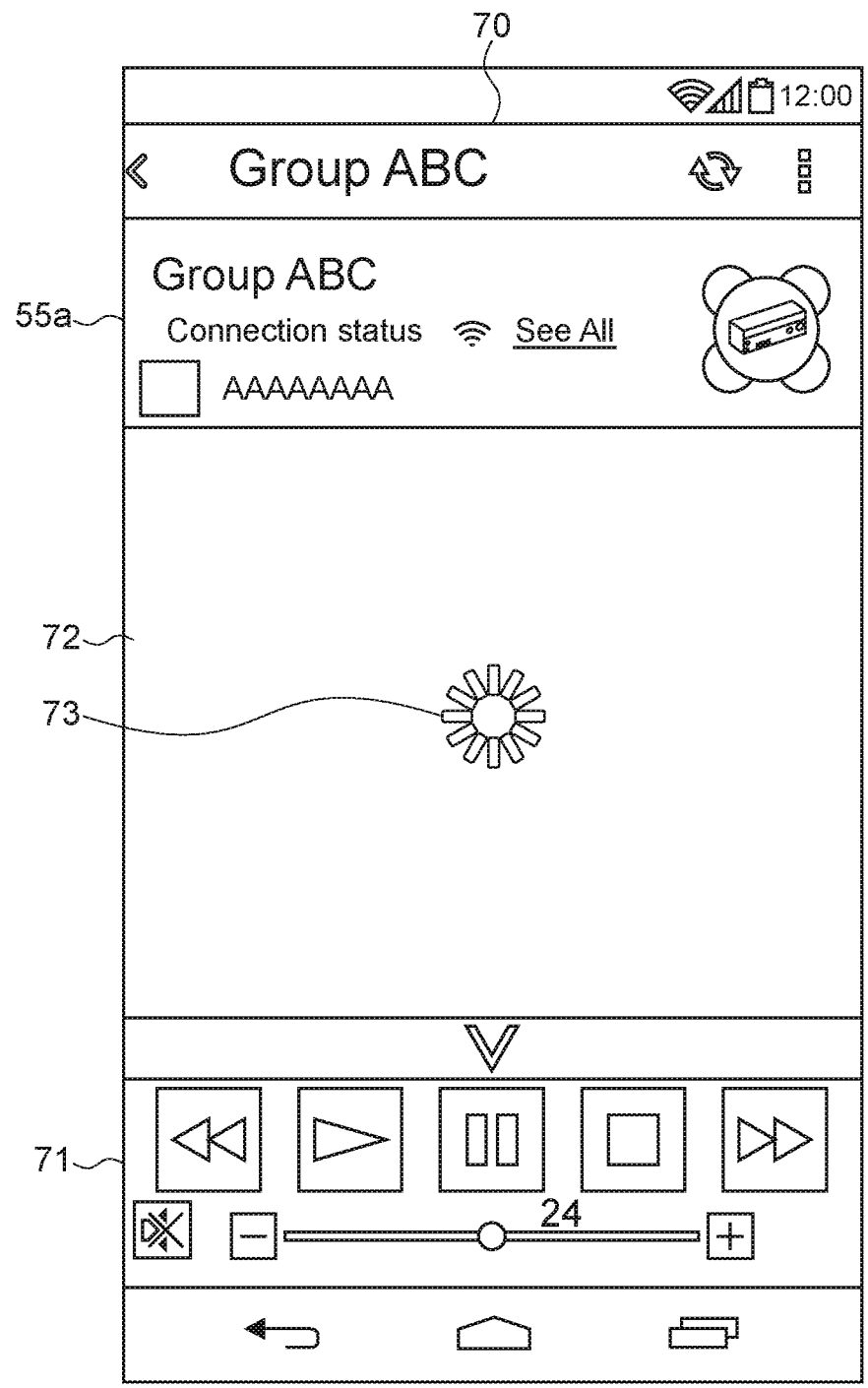
FIG. 8 is a schematic diagram showing a configuration example of a standby screen.
Figure 9:
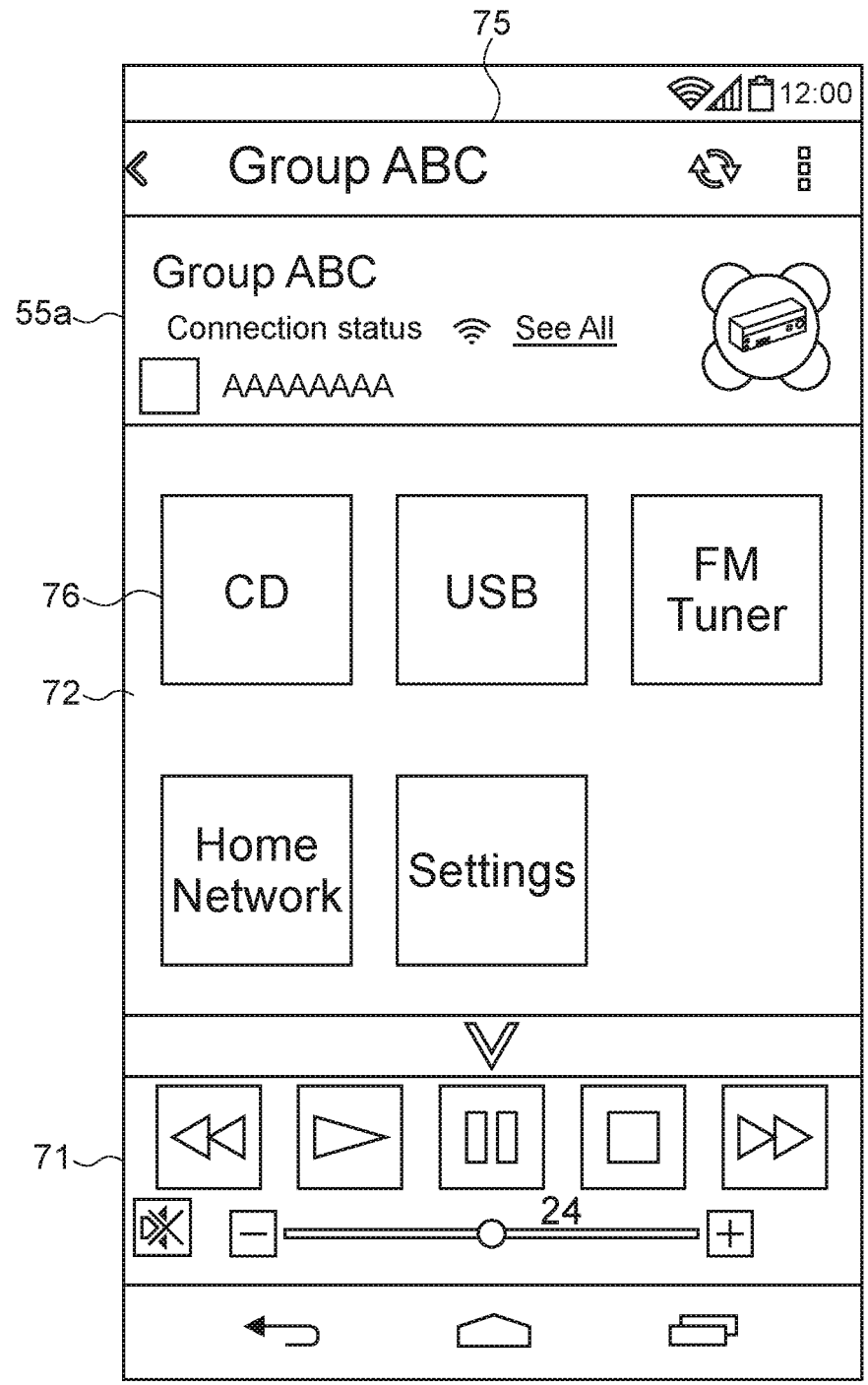
FIG. 9 is a schematic diagram showing a configuration example of a dashboard screen.
Figure 10:
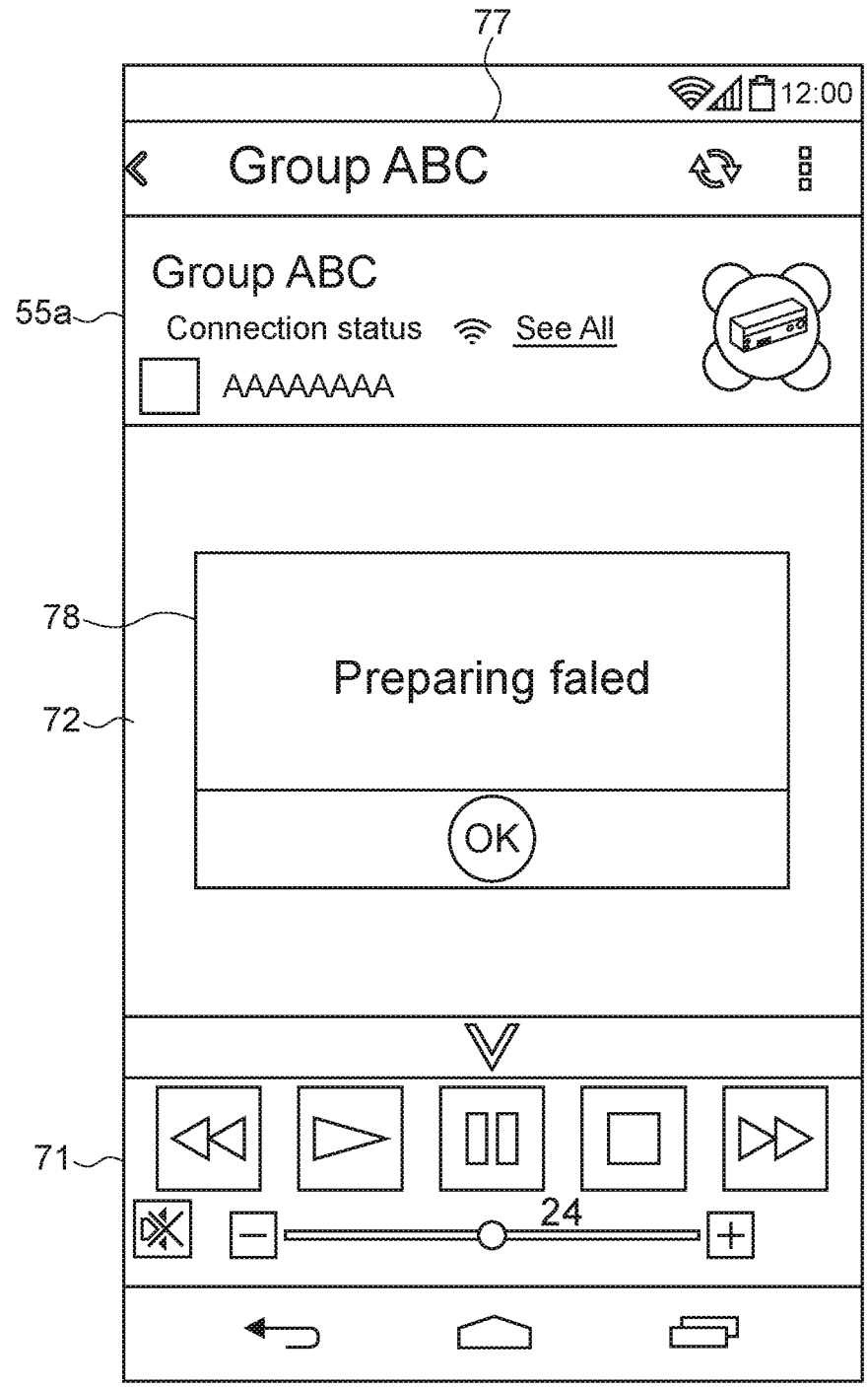
FIG. 10 is a schematic diagram showing a configuration example of an error screen.

FIG. 7 is a flowchart showing a processing example in the case where reproduction environment information regarding a group reproduction mode is selected. FIG. 8 to FIG. 10 are each a schematic diagram showing an example of a screen (image) displayed in the processing. The screen may be generated by, for example, the list generation unit 46 or another image generation block.

When the reproduction environment information is selected (Step 301), a standby screen 70 shown in FIG. 8 is displayed. On the standby screen 70, the selected reproduction environment information (the history information 55$a$ in this example) and an operation GUI 71 for controlling reproduction of content are displayed. The center of the screen is a display area 72 of operation information, and a mark 73 representing that processing is in progress is displayed therein.

While the standby screen 70 is displayed, the network status of the selected reproduction environment information is determined (Step 302). In the case where the network status is the active status (Yes in Step 302), a dashboard screen 75 shown in FIG. 9 is displayed (Step 303).

For example, the case where the history information 55 or the new detection information 60 in the active status is selected corresponds thereto.

The dashboard screen 75 is a screen displayed in the case where preparation for the reproduction environment regarding the selected reproduction environment information has been completed. Therefore, in the case where the network status is the active status, the screen is rapidly moved to the dashboard screen 75 (the standby screen 70 is not display in some cases).

In the display area 72 of the dashboard screen 75, an icon 76 indicating the type of content that is reproducible in the reproduction environment in which preparation has been completed is displayed. In the example shown in FIG. 9, the icon 76 of content of which multi-room reproduction can be performed by the reproduction apparatuses A, B, and C is displayed. The user is capable of grasping that the reproduction environment has been realized, by checking the display of the dashboard screen 75.

Note that in accordance with a user operation, various types of information are display in the display area 72. Examples thereof include the list of reproducible content, information regarding content being reproduced, and a GUI for executing various types of setting. Examples thereof include GUIs for performing sound quality setting, EQ (equalizer) setting, timer setting, other setting, and the like.

In the case where the network status is the non-active status (No in Step 302), whether or not all the reproduction apparatuses 10 forming a group have been detected is determined (Step 304). In the case where there is an undetected reproduction apparatus 10 (No in Step 304), a Wake-on-LAN packet (WOL packet) is transmitted to the reproduction apparatus 10 (Step 305).

After transmitting the Wake-on-LAN packet, whether or not all the reproduction apparatuses 10 have been detected within a predetermined time is determined (Step 306). In the case where there is an undetected reproduction apparatus 10 (No in Step 306), an error screen 77 shown in FIG. 10 is displayed. In the display area 72 of the error screen 77, an error dialogue 78 is displayed (Step 307). When the error screen 77 is displayed, the processing is finished without establishing the reproduction environment corresponding to the selected reproduction environment information.

Note that the processing of making it possible to detect the undetected reproduction apparatus 10 is not limited to the transmission of the Wake-on-LAN packet, and other processing may be executed.

In the case where all the reproduction apparatuses 10 have been detected in Step 304 or 306, the processing proceeds to Yes, and whether or not there is a reproduction apparatus 10 belonging to a different group is determined (Step 308). The "belonging to a different group" typically represents forming a group with another reproduction apparatus 10 that is not included in the reproduction environment information. Other examples thereof include a case where another group reproduction mode is set.

In the case where there is no reproduction apparatus 10 belonging to the different group (No in Step 308), all the detected reproduction apparatuses 10 form a group of the group reproduction mode included in the reproduction environment information (Step 309). For example, as described above, a master apparatus and slave apparatuses are set, and the group is formed mainly by the master apparatus.

In the case where there is a reproduction apparatus 10 belonging to the different group (Yes in Step 308), the different group is dissolved, and the processing stands by until all the reproduction apparatuses 10 enter the single reproduction mode (Step 310). The dissolution of the group is realized by, for example, transmitting a group dissolution request to the master apparatus of the group. When the dissolution of the group is completed, the reproduction mode of each of the reproduction apparatuses 10 is set to the single reproduction mode.

All the reproduction apparatuses 10 enter the single reproduction mode, a group of the group reproduction mode included in the selected reproduction environment information is created (Step 309). In the case where a group is successfully created (Yes in Step 311), the dashboard screen 75 shown in FIG. 9 is displayed (Step 303). Meanwhile, the creation of a group fails (No in Step 311), the error screen 77 shown in FIG. 10 is displayed (Step 307). The success/failure of the creation of a group is executed on the basis of, for example, notification or the like from the master apparatus.

In the case where the new detection information 60 has been selected and the dashboard screen 75 has been displayed, the new detection information 60 is registered as the history information 55 and added to the first display area 51. In the case where the history information 55 has been selected and the dashboard screen 75 has been displayed, the display position in the first display area 51 moves to the uppermost position. A mode or the like for regulating the movement of the history information 55 in the first display area 51 may be settable.

Note that in the case where the reproduction environment information of the single reproduction mode has been selected, the network status of the reproduction apparatus 10 included in the reproduction environment information is determined, and a Wake-on-LAN packet is transmitted in the case where the network status is the non-active status. In the case where the reproduction apparatus 10 has not been detected even when a predetermined time has elapsed, the error screen 77 is displayed.

In the case where the network status is the active status, whether or not it is the single reproduction mode is determined, and the dashboard screen 75 is displayed in the case where the determination is Yes. In the case where the reproduction mode is the group reproduction mode, the group is dissolved and the processing stands by until it becomes the single reproduction mode. When it becomes the single reproduction mode, the dashboard screen 75 is displayed.

Figure 11:
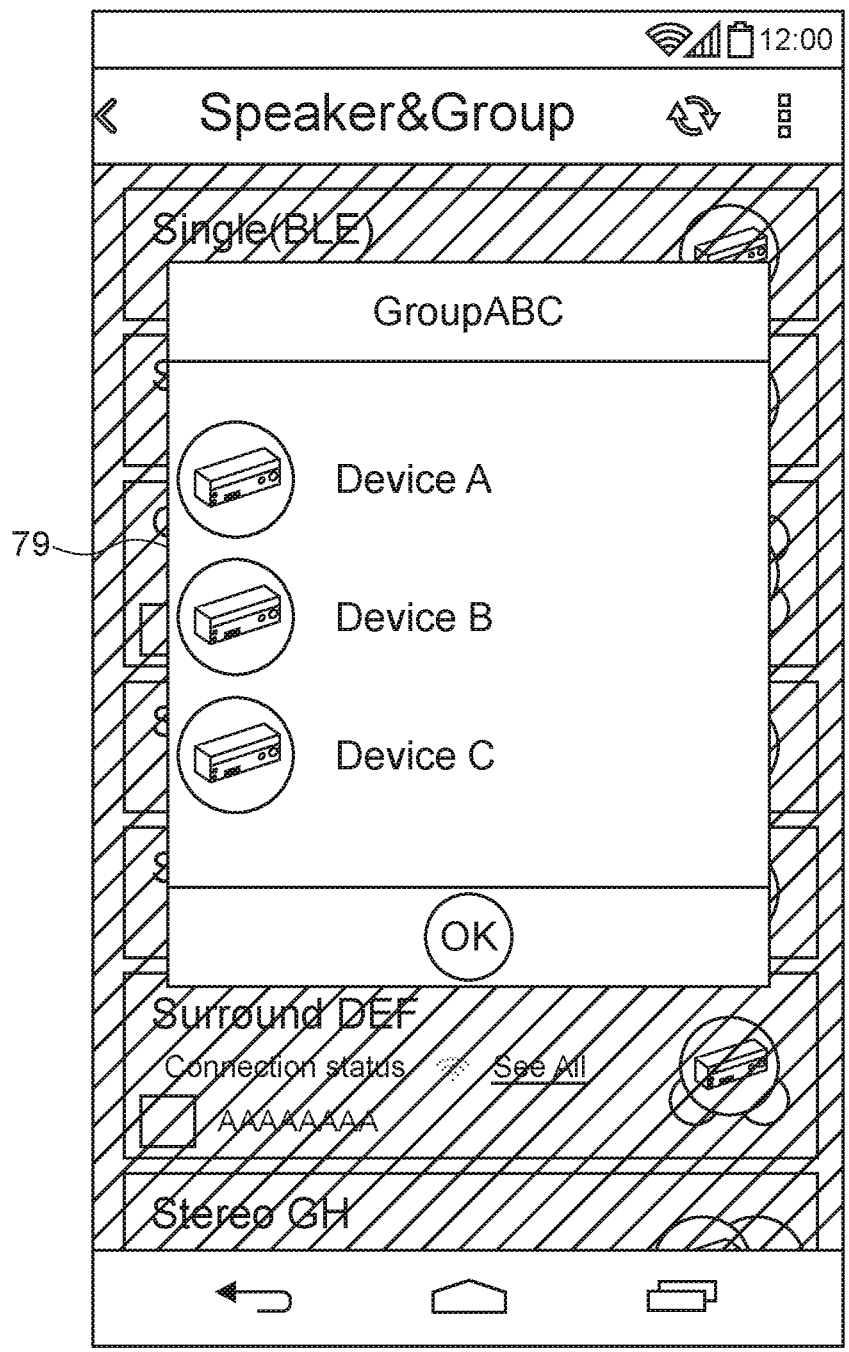
FIG. 11 is a schematic diagram showing an example of a group information display dialogue.

FIG. 11 is a schematic diagram showing an example of a group information display dialogue 79. When an apparatus display button "See All" displayed in the reproduction environment information of the group reproduction mode is selected, the group information display dialogue 79 including information regarding each of the reproduction apparatuses 10 forming the group is displayed. In the example shown in FIG. 11, the name of each of the reproduction apparatuses 10 is displayed. By selecting the name, the screen transits to a detailed screen regarding each of the reproduction apparatuses 10. The specific configuration of the group information display dialogue 79, information to be displayed, and the like may be appropriately set.

Figure 12:
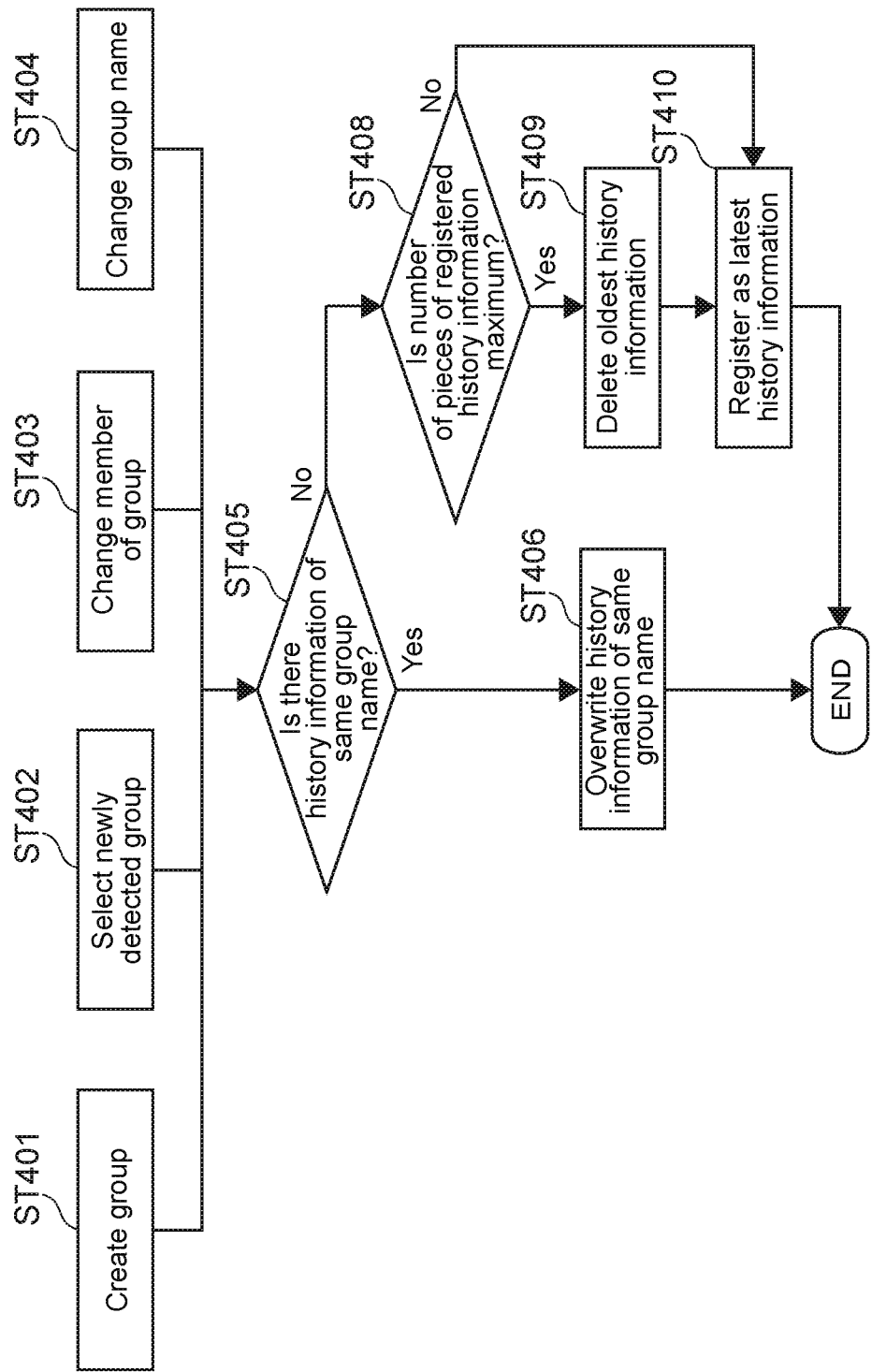
FIG. 12 is a flowchart showing an example of registration processing of history information.

FIG. 12 is a flowchart showing an example of registration processing of the history information 55. As described above, the history information 55 is generated and stored in the storage unit every time the user selects the reproduction apparatus 10 and the reproduction mode thereof. As the registration example, processing based on the name of a group as shown in FIG. 12 may be executed.

For example, a group is created via a GUI for creating a group, or the like (Step 401). When a group is created, for example, a default name of the group is generated. Alternatively, a name of the group is input by a user.

Further, the newly-detected group is selected, i.e., the new detection information 60 in the group reproduction mode is selected (Step 402). In this case, the name of the group is included in the new detection information 60.

A member of the group is changed (Step 403). For example, after the reproduction environment information of the group reproduction mode in the reproduction list 50 is selected, a predetermined member change button or the like is selected, thereby executing the change of the member. In accordance with a user operation for changing the member, a request for addition to the group, withdrawal from the group, or the like is transmitted to the master apparatus. Note that the name of the group is included in the selected reproduction environment information.

The user changes the name of the group (Step 404). For example, for example, after the reproduction environment information of the reproduction mode in the reproduction list 50 is selected, an operation of changing the name of the group is input. The method therefor, a GUI to be used, and the like are not limited.

In the case where Steps 401 to 404 have been executed, whether or not there is history information 55 of the same name of the group among the history information 55 registered in the storage unit is determined (Step 405). In the case where there is the history information 55 of the same name of the group (Yes in Step 405), the history information 55 is overwritten (Step 406).

As described above, overwriting of the history information 55 may be executed. As a result, for example, it is possible to update, in the case where arrangement of the reproduction apparatuses 10 is changed or an old reproduction apparatus 10 is discarded and a new reproduction apparatus 10 is placed, the history information 55 regarding the reproduction environment that does not need to be reproduced in the future. Note that a dialogue or the like for inquiring of the user as to whether or not the overwriting is to be executed may be displayed.

In the case where there is no history information 55 of the same name of the group (No in Step 405), whether or not the number of pieces of registered history information 55 is the maximum is determined (Step 407). The maximum number of pieces of registerable history information 55 is not limited and may be appropriately set.

In the case where the number of pieces of registered history information 55 is the maximum (Yes in Step 408), the oldest history information 55 is deleted (Step 409). Then, the reproduction environment information generated/changed in accordance with the operations of Steps 410 to 404 is registered as the latest history information 55 (Step 410). In the case where the number of pieces of registered history information 55 is not the maximum (No in Step 408), deletion of the oldest history information 55 is not executed, and the latest history information 55 is registered (Step 410).

As described above, the maximum number of pieces of registerable history information 55 may be set. As a result, it is possible to delete the reproduction environment information corresponding to the reproduction environment that has not been used for a long time, and reduce the necessary memory capacity. Note that the user may select desired history information 55 from the reproduction list 50, and delete it.

The maximum number of pieces of registerable history information 55 may be set for each reproduction mode. For example, each of the number of registerable single reproduction modes and the number of registerable group reproduction modes may be set. Then, updating (deletion or the like of the old history information) of the history information may be executed for each reproduction mode. Further, the registerable number may be set for each group reproduction mode (the multi-room reproduction mode, the surround reproduction mode, or the stereo reproduction mode).

As described above, in the content reproduction system 100 according to this embodiment, the reproduction list 50 including the detection information (the new detection information 60) and the history information 55 is generated. The detection information includes the reproduction apparatus 10 detected by the portable terminal 30, and the reproduction mode thereof. The history information. 55 includes the reproduction apparatus 10 selected in the past, and the history information. 55 at that time. This makes it possible to easily reproduce the past reproduction environment by using the displayed history information 55, for example. As a result, it is possible to control the reproduction apparatuses 10 with good operability.

The case where only the detected reproduction apparatus or the group thereof is displayed will be considered. In this case, information regarding an undetected reproduction apparatus (reproduction apparatus in a power OFF or a stand-by status) and the group to which the reproduction apparatus belongs is not displayed. Therefore, for example, in the case where a reproduction apparatus of the group that is frequently used is not detected, it is difficult to realize reproduction of content by the group that is frequently used. For example, it is necessary to make the group detectable by an operation of finding out, by himself/herself, the reason why the group is not displayed and turning on the power of the undetected reproduction apparatus. Then, after the group is detected and displayed on the list, reproduction of content can be performed.

Further, the same is true also in the case where the group that is frequently used does not exist due to, for example, a change of the group by another user. That is, it is necessary to consider the reason why the group is not displayed, and reestablish the changed group, for example.

Meanwhile, in this the content reproduction system 100, the history information 55 of the group that is frequently used is displayed on the reproduction list 50. The history information 55 is displayed regardless of the network status, i.e., whether or not the group currently exists or whether or not the reproduction apparatus 10 belonging to the group is in the active status. Therefore, the user is capable of easily realizing reproduction of content by the group by simply selecting, from the reproduction list 50, the history information 55 of the group that is frequently used, by one tap. As a result, it is possible to exert very high operability.

Other Embodiments

The present technology is not limited to the above-mentioned embodiment, and various other embodiments can be realized.

In the above, the case where the history information is registered in the storage unit of the portable terminal has been described. The present technology is not limited thereto, and the history information including the reproduction mode when the reproduction apparatus is selected may be stored in a memory or the like of the reproduction apparatus selected by the user. Then, the portable terminal may request for history information to the detected reproduction apparatus, and the history information may be returned in response thereto. That is, the history information acquisition unit of the portable terminal may acquire history information from the detected reproduction apparatus. As a result, it is possible to reduce the necessary memory capacity, and acquire history information with high accuracy.

In the case where history information is stored in both the portable terminal and the reproduction apparatus, a fourth display area in which the history information stored in the portable terminal is displayed, and a fifth display area in which the history information acquired from the reproduction apparatus is displayed may be set in the first display area of the reproduction list. That is, the history information stored in the portable terminal and the history information acquired from the reproduction apparatus may be displayed on different positions. For example, by setting conditions or the like for prescribing the case where the portable terminal stores it and the case where the reproduction apparatus stores it, display of the history information according to the conditions is realized. As a result, it is possible to exert high operability.

The type of operations that can be input to the reproduction list is not limited. It is possible to perform arbitrary operations such as the creation of a new group, dissolution of a group, changing a member of a group, and deletion of reproduction information described above.

The display order of the reproduction environment information in the reproduction list, i.e., the display order (order of addition) of the history information in the first display area or the display order (order of addition) of the detection information in the second display area may be arbitrarily set. Further, the displayed part may be changeable as appropriate by the user.

In the above description, the reproduction list has been displayed as the operation image according to the present technology. The present technology is not limited thereto, and another arbitrary GUI for operation may be displayed as the operation image. Further, a group reproduction list including history information and detection information of only the group reproduction mode (the multi-room reproduction mode, the surround reproduction mode, and the stereo reproduction mode) may be displayed as the operation image.

In the above description, as communication examples for controlling the reproduction apparatus, network communication, BLE communication, and BT communication have been described. The present technology is not limited to such communication, and is applicable to an arbitrary communication method. For example, short-range wireless communication or the like different from the network communication may establish the group reproduction mode.

In the above, the case where the computer such as a portable terminal operated by the user executes the information processing method according to the present technology has been described. However, the information processing method and the program according to the present technology may be executed by another computer capable of communicating with the computer operated by the user via a network or the like. Further, the content reproduction system according to the present technology may be established by the cooperation of the computer operated by the user and another computer.

That is, the information processing method and the program according to the present technology can be executed not only in a computer system including a single computer but also in a computer system in which a plurality of computers operate in cooperation. Not that in the present disclosure, the system refers to a set of a plurality of components (apparatuses, modules (parts), and the like). Whether all the components are in the same casing or not is not considered. Therefore, both of a plurality of apparatuses stored in separate casings and connected via a network and one apparatus having a plurality of modules stored in one casing are systems.

The execution of the information processing method and the program according to the present technology by the computer system includes, for example, a case where acquisition of history information, generation of an operation image, and the like are executed by a single computer, and a case where each process is executed by different computers. Further, the execution of each process by a predetermined computer includes causing another computer to execute a part or all of the process and acquiring the result.

That is, the information processing method and the program according to the present technology are applicable also to the configuration of cloud computing in which one function is shared by a plurality of apparatuses via a network and processed in cooperation with each other.

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may take the following configurations.

(1) An information processing apparatus, including:
a detection unit that detects a reproduction apparatus;
a first acquisition unit that acquires a reproduction mode of the detected reproduction apparatus;
a second acquisition unit that acquires history information, the history information including a reproduction apparatus selected in a past and a reproduction mode of the reproduction apparatus when the reproduction apparatus has been selected in the past; and
a generation unit that generates an operation image, the operation image including detection information and the acquired history information, the detection information including the detected reproduction apparatus and a reproduction mode of the reproduction apparatus when the reproduction apparatus has been detected.

(2) The information processing apparatus according to (1), in which
the reproduction mode includes a single reproduction mode and a group reproduction mode.

(3) The information processing apparatus according to (2), in which
each of the history information and the detection information includes, as information regarding the reproduction apparatus having the reproduction mode being the single reproduction mode, at least one of a name of the reproduction apparatus and an icon representing that it is the single reproduction mode.

(4) The information processing apparatus according to (2) or (3), in which
each of the history information and the detection information includes, as information regarding the reproduction apparatus having the reproduction mode being the group reproduction mode, at least one of a name of a group including the reproduction apparatus and an icon representing that it is the group reproduction mode.

(5) The information processing apparatus according to any one of (2) to (4), in which
the group reproduction mode includes a synchronous reproduction mode, a surround reproduction mode, and a stereo reproduction mode.

(6) The information processing apparatus according to any one of (1) to (5), in which
the operation image includes a first display area and a second display area, the history information being displayed in the first display area, new detection information that is not included in the history information among the detection information being displayed in the second display area.

(7) The information processing apparatus according to (6), in which
the operation image is a list, and
the first display area is set above the second display area.

(8) The information processing apparatus according to (6) or (7), in which
the detection unit detects an unconnected reproduction apparatus requiring a connection instruction from a user, and
the list includes a third display area, information regarding the unconnected reproduction apparatus being displayed in the third display area.

(9) The information processing apparatus according to (8), in which
the detection unit detects the unconnected reproduction apparatus through short-range wireless communication.

(10) The information processing apparatus according to (8) or (9), in which
the third display area is set above the first display area.

(11) The information processing apparatus according to any one of (1) to (10), in which
the generation unit determines an operation status of the reproduction apparatus and the reproduction mode thereof included in the history information, and generates the operation image in such a way that a display form differs depending on a result of the determination.

(12) The information processing apparatus according to any one of (1) to (11), further including
a reproduction control unit that instructs reproduction of content by the reproduction apparatus and the reproduction mode thereof included in the operation image.

(13) The information processing apparatus according to any one of (1) to (12), in which
the second acquisition unit acquires the history information from the detected reproduction apparatus.

REFERENCE SIGNS LIST 1 home network
10 reproduction apparatus
30 portable terminal
43 apparatus detection unit
44 reproduction mode acquisition unit
45 history information acquisition unit
46 list generation unit
47 reproduction control unit
50 reproduction list
51 first display area
52 second display area
53 third display area 55 history information
56 icon representing that it is a single reproduction mode
58 icon representing that it is a group reproduction mode
60 new detection information
61 detection information
70 standby screen
75 dashboard screen
77 error screen
100 content reproduction system

The invention claimed is:

1. An information processing apparatus, comprising: circuitry configured to: detect at least one reproduction apparatus of a plurality of reproduction apparatuses; acquire a first reproduction mode of the detected at least one reproduction apparatus, wherein the first reproduction mode indicates whether a single reproduction apparatus or the plurality of reproduction apparatuses reproduces content; acquire history information associated with the detected at least one reproduction apparatus, wherein the history information comprises selection information of the detected at least one reproduction apparatus selected in a past and a second reproduction mode of the detected at least one reproduction apparatus when the detected at least one reproduction apparatus was selected in the past, the second reproduction mode indicates whether the single reproduction apparatus or the plurality of reproduction apparatuses reproduced the content, the detected at least one reproduction apparatus is in the second reproduction mode at a first time period, the detected at least one reproduction apparatus is in the first reproduction mode at a second time period, and the first time period precedes the second time period; and generate an operation image comprising detection information of the detected at least one reproduction apparatus and the acquired history information, wherein the detection information includes the first reproduction mode of the detected at least one reproduction apparatus when the at least one reproduction apparatus is detected, and both the first reproduction mode and the second reproduction mode is one of a single reproduction mode associated with the single reproduction apparatus or a group reproduction mode associated with the plurality of reproduction apparatuses.

2. The information processing apparatus according to claim 1, wherein the history information includes, based on the second reproduction mode is the single reproduction mode, at least one of a name of the at least one reproduction apparatus or an icon that represents the single reproduction mode, and the detection information includes, based on the first reproduction mode is the single reproduction mode, at least one of the name of the at least one reproduction apparatus or the icon the represents the single reproduction mode.

3. The information processing apparatus according to claim 1, wherein the history information includes, based on the second reproduction mode is the group reproduction mode, at least one of a name of a group including the at least one reproduction apparatus or an icon that represents the group reproduction mode, and the detection information includes, based on the first reproduction mode is the group reproduction mode, at least one of the name of the group including the at least one reproduction apparatus or the icon that represents the single reproduction mode.

4. The information processing apparatus according to claim 1, wherein the group reproduction mode is one of a synchronous reproduction mode, a surround reproduction mode, and a stereo reproduction mode.

5. The information processing apparatus according to claim 1, wherein the operation image includes a first display area and a second display area, the first display area displays the history information, and the second display area displays the detection information, which is absent in the history information, associated with newly detected at least one reproduction apparatus of the plurality of reproduction apparatuses.

6. The information processing apparatus according to claim 5, wherein the operation image is a list, and the first display area is set above the second display area.

7. The information processing apparatus according to claim 6, wherein the circuitry is further configured to:

detect an unconnected reproduction apparatus that requires a connection instruction from a user, and the list includes a third display area which displays information associated with the unconnected reproduction apparatus.

8. The information processing apparatus according to claim 7, wherein the circuitry is further configured to detect the unconnected reproduction apparatus based on short-range wireless communication.

9. The information processing apparatus according to claim 7, wherein the third display area is set above the first display area.

10. The information processing apparatus according to claim 1, wherein the circuitry is further configured to:

determine an operation status of the detected at least one reproduction apparatus and the second reproduction mode included in the history information, and generate the operation image with a display form based on a result of the determination of the operation status.

11. The information processing apparatus according to claim 1, wherein the circuitry is further configured to instruct reproduction of the content by the detected at least one reproduction apparatus based on one of the first reproduction mode or the second reproduction mode included in the operation image.

12. The information processing apparatus according to claim 1, wherein the circuitry is further configured to acquire the history information from the detected at least one reproduction apparatus.

13. An information processing method, comprising:

detecting at least one reproduction apparatus of a plurality of reproduction apparatuses;

acquiring a first reproduction mode of the detected at least one reproduction apparatus, wherein the first reproduction mode indicates whether a single reproduction apparatus or the plurality of reproduction apparatuses reproduces content;

acquiring history information associated with the detected at least one reproduction apparatus, wherein the history information comprises selection information of the detected at least one reproduction apparatus selected in a past and a second reproduction mode of the detected at least one reproduction apparatus when the detected at least one reproduction apparatus was selected in the past, the second reproduction mode indicates whether the single reproduction apparatus or the plurality of reproduction apparatuses reproduced the content, the detected at least one reproduction apparatus is in the second reproduction mode at a first time period, the detected at least one reproduction apparatus is in the first reproduction mode at a second time period, and the first time period precedes the second time period; and generating an operation image comprising detection information of the detected at least one reproduction apparatus and the acquired history information, wherein the detection information includes the first reproduction mode of the detected at least one reproduction apparatus when the at least one reproduction apparatus is detected, and both the first reproduction mode and the second reproduction mode is one of a single reproduction mode associated with the single reproduction apparatus or a group reproduction mode associated with the plurality of reproduction apparatuses.

14. A non-transitory computer-readable medium having stored thereon computer-executable instructions that, when executed by a processor, cause a computer to perform operations, comprising: detecting at least one reproduction apparatus of a plurality of reproduction apparatuses; acquiring a first reproduction mode of the detected at least one reproduction apparatus, wherein the first reproduction mode indicates whether a single reproduction apparatus or the plurality of reproduction apparatuses reproduces content; acquiring history information associated with the detected at least one reproduction apparatus, wherein the history information comprises selection information of the detected at least one reproduction apparatus selected in a past and a second reproduction mode of the detected at least one reproduction apparatus when the detected at least one reproduction apparatus was selected in the past, the second reproduction mode indicates whether the single reproduction apparatus or the plurality of reproduction apparatuses reproduced the content, the detected at least one reproduction apparatus is in the second reproduction mode at a first time period, the detected at least one reproduction apparatus is in the first reproduction mode at a second time period, and the first time period precedes the second time period; and generating an operation image comprising detection information of the detected at least one reproduction apparatus and the acquired history information, wherein the detection information includes the first reproduction mode of the detected at least one reproduction apparatus when the at least one reproduction apparatus is detected, and both the first reproduction mode and the second reproduction mode is one of a single reproduction mode associated with the single reproduction apparatus or a group reproduction mode associated with the plurality of reproduction apparatuses.

* * * * *